United States Patent [19]

Takeya et al.

[11] 4,022,750
[45] May 10, 1977

[54] PROCESS FOR THE PRODUCTION OF A HALOGEN-CONTAINING ARCYLIC SYNTHETIC FIBER IMPROVED IN FLAME RETARDANCY

[75] Inventors: Kenji Takeya; Hiroshi Suzuki; Tadashi Ichimaru, all of Okayama, Japan

[73] Assignee: American Cyanamid Company, Stamford, Conn.

[22] Filed: July 11, 1974

[21] Appl. No.: 487,529

[52] U.S. Cl. .............. 260/45.75 H; 260/29.6 AN; 260/29.6 AB; 260/30.8 DS; 260/31.2 N; 260/32.6 N; 260/45.7 P; 260/45.75 K; 260/895; 260/898; 264/182

[51] Int. Cl.² ............ C08K 3/22; C08K 5/02

[58] Field of Search ............ 260/45.75 K, 45.75 H, 260/895, 898

[56] References Cited

UNITED STATES PATENTS

| | | | |
|---|---|---|---|
| 2,592,926 | 4/1952 | Mack | 260/45.75 K |
| 3,088,932 | 5/1963 | Tarkington | 264/182 |
| 3,313,768 | 4/1967 | Veazey et al. | 260/45.75 K |
| 3,642,628 | 2/1972 | Palethorpe | 260/45.75 K |

*Primary Examiner*—James H. Derrington
*Attorney, Agent, or Firm*—William J. van Loo

[57] ABSTRACT

Halogen-containing acrylic fibers are improved in flame retardancy when a diorganotin oxide compound is incorporated therein.

8 Claims, No Drawings

PROCESS FOR THE PRODUCTION OF A HALOGEN-CONTAINING ARCYLIC SYNTHETIC FIBER IMPROVED IN FLAME RETARDANCY

This invention relates to acrylic halogen-containing fibers that are improved in flame retardancy by also containing an effective amount of a diorganotin oxide compound. More particularly, the invention relates to such fibers which are prepared by dispersing the diorganotin oxide compound in the spinning composition from which the fibers are spun.

Fibers obtained from conventional acrylonitrile polymers and copolymers have found a wide variety of applications in the field of textiles and home furnishings. However, since these fibers are essentially lacking in flame retardancy, they are not desirable for special uses, for example, as home furnishings such as carpets, curtains, etc. or as clothing for infants and children.

In order to overcome the defect of lack of flame retardancy, a number of methods have been proposed. For example, it has been proposed to copolymerize acrylonitrile with a copolymerizable monomer which will impart flame retardancy to the copolymer; to blend-spin a flame-retardant polymer with an acrylonitrile polymer or copolymer; to spin a spinning composition in which a flame retardant is added; to treat the fiber with a flame-retardant finish; and the like.

More particularly, acrylic fibers can be rendered flame retardant by introducing halogen groups into the fibers such as by copolymerizing acrylonitrile with a halogen-containing monomer such as vinyl chloride, vinylidene chloride, etc.; by blend-spinning a homopolymer or copolymer of acrylonitrile with a halogen-containing polymer such as polyvinyl chloride, polyvinylidene chloride, etc.; and by incorporating a halogen-containing flame retardant into the spinning solution from which the acrylic fiber is to be spun.

In accordance with social trends over recent years, there exists a great demand for highly flame retardant textile products: To meet this demand as it relates to acrylic fibers, it has been proposed to introduce the increased amount of halogen necessary for high degrees of flame retardancy by one of the proposed methods described above. Although such provisions certainly result in improved flame retardancy, there arises the problem that the physical properties of the modified acrylic fibers, such as, for example, dyeability and tactile properties, are greatly impaired compared to the corresponding properties of the unmodified acrylic fibers. That is to say, fibers obtained from copolymers in which the amount of halogen-containing monomer is increased are low in heat resistance, light resistance, color fastness to sunlight, dimensional stability and the final products produced from such fibers are inferior in tactile properties relative to the conventional acrylic fibers. Also, use of increased amounts of flame retardant additives reduces heat resistance, weathering resistance, transparency and dyeability of the fibers or will give rise to corrosion problems with respect to the spinning machines used in yarn spinning.

To correct these problems, it has been proposed to add to the fiber a synergist which improves flame retardancy. However, since the conventional synergists, such as antimony trioxide and acrylonitrile are incompatible, the resulting fibers are seriously lowered in strength and luster, thus becoming of low quality. In addition, the tactile qualities, i.e., hand and feel, and the dyeability of such fibers are greatly inferior to those of the conventional acrylic fibers. A further complication arises from the large amounts of antimony trioxide required to attain a desired increase in flame retardancy, which leads to high degrees of property impairments.

A primary object of the present invention, therefore, is to provide a halogen-containing acrylic fiber of improved flame retardancy while retaining at desirable levels such properties as dyeability, strength, transparency, tactile qualities, etc.

In accordance with the present invention, there is provided a process for preparing a halogen-containing acrylic fiber of improved flame retardancy which comprises: preparing a spinning composition of a halogen-containing acrylonitrile polymer composed of at least 50 weight percent acrylonitrile, said halogen being selected from chlorine and bromine and being in the amount of about 3 to 40 weight percent based on the weight of said polymer; uniformly dispersing in said spinning composition from about 0.1 to 10 weight percent, based on the weight of said polymer, of a diorganotin oxide compound; and spinning the resulting dispersion.

The process of the present invention provides halogen-containing acrylic fibers that are improved in flame retardancy and, at the same time, retain at desirable levels such other properties as dyeability, strength, transparency, tactile qualities, etc. in an industrial and advantageous manner.

Although the present inventors do not know the exact mechanism whereby the improved results are achieved and do not wish to be bound by any theory, it is their view that synergistic action between the halogen contained in the fiber-forming composition and the tin of the diorganotin oxide compound dispersed therein imparts the improved flame retardancy.

It is an advantage of the present invention that the diorganotin oxide compound achieves the improved flame retardancy at a lower usage level than conventional synergists such as antimony oxide.

In carrying out the process of the present invention, the diorganotin oxide compound may be incorporated in the fiber in several alternative embodiments. In a first embodiment, the fiber-forming polymer may be a copolymer of at least 50 weight percent acrylonitrile, sufficient of a halogen-containing monomer to provide 3 to 40 weight percent of halogen, based on the weight of the polymer, and any balance of one or more ethylenically unsaturated monomers copolymerizable with acrylonitrile. In such case, the polymer is rendered into a spinning formulation, the diorganotin oxide compound is uniformly dispersed therein, and the resulting dispersion is then spun into fiber.

In a second embodiment, an acrylonitrile polymer or copolymer containing less than the desired content of halogen is mixed with a halogen-containing polymer to provide a composition of the desired halogen content and the composition rendered into a spinning formulation. The diorganotin oxide compound is then uniformly dispersed into the formulation and the resulting dispersion is then spun into fiber.

In a third embodiment, an acrylonitrile polymer or copolymer is rendered into a spinning composition and a suitable amount of halogen-containing flame retardant is incorporated therein along with the diorganotin oxide compound and the resulting dispersion is spun into fiber.

Of the three embodiments for incorporating the diorganotin compound into the fiber, the first embodiment is greatly preferred. Of course, combinations of these embodiments may also be used.

The acrylonitrile polymers useful in the present invention include homopolymers of acrylonitrile and copolymers of acrylonitrile and one or more ethylenically unsaturated compounds copolymerizable therewith. It is essential that the acrylonitrile polymer contains at least 50 weight percent of acrylonitrile in order to achieve the object of the invention. As has been indicated, it is not necessary for the acrylonitrile polymer to contain a halogen selected from chlorine and bromine as a result of copolymerization with a halogen-containing monomer. Ethylenically unsaturated monomers copolymerizable with acrylonitrile which are free from halogen content include vinyl acetate, vinyl propionate; allyl alcohol; allyl and methallyl acetates; acrylic acid and alkacrylic acids such as methacrylic acid and ethacrylic acid, as well as esters and amides of such acids, e.g., methyl, ethyl, propyl, butyl, etc., acrylates and alkacrylates, acrylamide, alkacrylamides, N-methyl, -ethyl, -propyl, -butyl, etc., acrylamides and alkacrylamides; methacrylonitrile; sulfonic acid-containing unsaturated compounds such as allylsulfonic acid, methallylsulfonic acid, styrenesulfonic acid, etc., and salts of these acids; vinylpyridines such as 2-vinylpyridine, 2-vinyl-3-methylpyridine, etc., and quaternary salts of such pyridines; aminoalkylacrylates and aminoalkylmethacrylates such as dimethylaminomethyl acrylate, dimethylaminoethyl methacrylate, etc., and their quaternary salts; and numerous other vinyl, acrylic and other compounds containing a single $CH_2=C<$ group which are copolymerizable with acrylonitrile to yield thermoplastic copolymers.

Halogen-containing monomers which may be used to provide an acrylonitrile copolymer containing at least 50 weight percent acrylonitrile and from about 3 to 40 weight percent of halogen based on the weight of the copolymer include vinyl bromide, vinyl chloride, vinylidene chloride, vinylidene bromide, 4-bromostyrene, p-chloromethylstyrene, 2,3-dichloropropyl acrylate and methacrylate, 2,3-dibromopropyl acrylate and methacrylate, chloromethyl vinyl ether, bromoethyl vinyl ether, and the like. When so used the halogen-containing monomer should preferably be incorporated into the copolymer in an amount sufficient to provide about 3 to about 40 weight percent of halogen, based on the weight of the copolymer. However, it is possible to use lower amounts of halogen-containing monomer in preparing the copolymer as long as provision for the necessary halogen content is made by one of the alternative embodiments described.

As halogen-containing polymers to be used in conjunction with the acrylonitrile polymer or copolymer, one may use homopolymers of vinyl chloride, vinyl bromide, vinylidene chloride, vinylidene bromide, copolymers of vinyl chloride or bromide and vinylidene chloride or bromide, and copolymers of the vinyl or vinylidene halides with acrylonitrile or another ethylenically unsaturated monomer, the latter constituting up to about 25 weight percent based on the weight of the copolymer. In preparing mixtures of polymers for fiber spinning, the amount of halogen present in the mixture generally will constitute from about 3 to 40 weight percent based on the total weight of the mixture. However, it is possible to add a halogen-containing flame retardant to the mixture to provide the necessary amount of halogen.

The useful halogen-containing flame retardants for purposes of the present invention include the conventional halogenated organic compounds well known for such use. These include such compounds as halogenated phosphorus compounds such as tris(2,3-dibromopropyl)phosphate, tris(1-bromo-3-chloroisopropyl)phosphate, tris(chloroethyl)phosphate, telomers produced from halomethane and unsaturated phosphates, reaction products of epoxy compounds and halogenated phosphorus and/or oxyhalogenated phosphorus, etc.; halogenated aliphatic hydrocarbons such as tetrabromobutane, tetrabromoethane, chlorinated paraffins, etc.; halogenated fatty acid esters such as methyl pentachlorostearate, methyl decachlorolaurate, ethyl pentabromostearate, etc.; halogenated fatty acid amides such as N,N-dimethyldibromostearamide, N,N-dimethyltetrabromostearamide, etc.; tetrabromobisphenol A and its halogenated alkyl derivatives; hexabromobenzene, etc.

The diorganotin oxide compounds useful in the present invention are those represented by formulas I and II below:

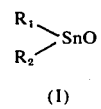

(I)

and

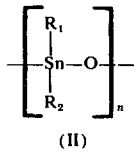

(II)

wherein $n$ is an integer of about 2 to about 10 and $R_1$ and $R_2$ are individually selected from alkyl, alkenyl, aryl, alkaryl, aralkyl, cycloalkyl, and cycloalkenyl groups containing up to about 22 carbon atoms. Typical groups represented by $R_1$ or $R_2$ include methyl, ethyl, propyl, butyl, amyl, hexyl, ethylhexyl, octyl, nonyl, decyl, dodecyl, lauryl, palmityl, stearyl, myristyl, phenyl, benzyl, cumyl, tolyl, xylyl, cyclobutyl, cyclohexyl, methylcyclohexyl, cyclopentyl, etc. $R_1$ and $R_2$ may be the same or different groups.

Among the various diorganotin oxide compounds useful, the following are particularly effective: dimethyltin oxide, diethyltin oxide, dipropyltin oxide, dibutyltin oxide, diamyltin oxide, dioctyltin oxide, didecyltin oxide, dilauryltin oxide, dipropenyltin oxide, diphenyltin oxide, dinaphthyltin oxide, ditolyltin oxide, methylethyltin oxide, phenylbutyltin oxide, dibenzyltin oxide, dixylyltin oxide, dicyclohexyltin oxide, methylcyclohexyltin oxide, and dicumyltin oxide.

The various diorganotin oxide compounds useful in the present invention are insoluble in the spinning composition used to form the fiber. Generally, the diorganotin oxide compounds are solids and may be added to spinning composition after being pulverized into fine particulate form. Alternatively, the diorganotin oxide compound may be dissolved in certain liquid organotin compounds and dispersed in such solution form. Useful liquid organotin compounds that may be used to dissolve the diorganotin oxide compounds are represented by the following structures:

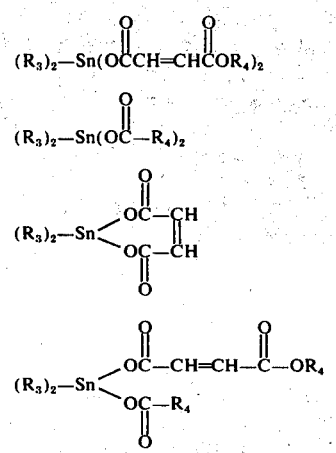

and

wherein
$R_3$ represents an alkyl group containing 1 to 10 carbon atoms, or an aryl group and $R_4$ represents an alkyl group of 1 to 20 carbon atoms or an aryl group. It is also possible to employ a mixture of two or more of the liquid organotin compounds to dissolve the diorganotin oxide compound. The resulting solutions can be employed to effect uniform addition of the diorganotin oxide compound to the spinning composition.

In carrying out the process of the present invention, one prepares the acrylonitrile fiber-forming polymer that is to be employed, i.e., one that contains at least about 50 weight percent of acrylonitrile. If the acrylonitrile fiber-forming polymer also contains the required halogen content, i.e., 3 to 40 weight percent chlorine or bromine based on the weight of the polymer, provision for halogen content is inherently made. If the acrylonitrile fiber-forming polymer does not have the desired halogen content in comonomer content, it is necessary to make provision for the desired halogen content by one of the appropriate embodiments. Thus, after preparing the acrylonitrile fiber-forming polymer, one must also select the embodiment by which the halogen content is to be achieved, if it is not present in the acrylonitrile fiber-forming polymer. Thus, one prepares the halogen-containing polymer or the halogen-containing compound to be employed with the appropriate acrylonitrile fiber-forming polymer. The proper amount of halogen-containing polymer or compound to provide the desired halogen content is then taken to prepare a spinning composition in conjunction with the acrylonitrile fiber-forming polymer.

Once the composition of acrylonitrile fiber-forming polymer, and if necessary, added halogen-containing polymer or compound, has been prepared, it is necessary to render such composition into a formulation suitable for spinning. The formulation suitable for spinning will depend upon the spinning method contemplated. Generally, the spinning of acrylic fibers is carried out by either dry or wet spinning procedures. However, fusion-melt spinning can also be employed. For wet spinning procedures, suitable solvents to dissolve the spinning composition include organic solvents such as dimethyl formamide, dimethyl acetamide, ethylene carbonate, and dimethyl sulfoxide and inorganic solvents such as concentrated aqueous solutions of inorganic salts such as sodium or calcium thiocyanate, zinc chloride, etc. For dry spinning, the organic solvents enumerated may be employed. For fusion-melt spinning one may use any of the solvents enumerated in appropriate amounts or such other fusion aids as are conventional. Similarly, other conventional solvents may be employed in dry or wet spinning procedures.

In the spinning formulation thus obtained is uniformly dispersed the diorganotin oxide compound in an amount of from about 0.1 to about 10 weight percent, based on the weight of the fiber-forming polymer. The diorganotin oxide compound may be dispersed as a powder in the spinning formulation or may be in the form of a solution in a liquid organotin compound, as previously indicated. Suitable mixing is employed to obtain a uniform dispersion. The uniform dispersion obtained is then ready for conventional spinning.

The acrylic fiber containing a diorganotin oxide compound and halogen according to the present invention have, besides a high degree of flame retardancy, the various desirable properties that conventional acrylic fibers possess, such as good dyeability, strength, transparency, hand, etc. Thus, by the process of the present invention, the commodity value of the flame retardant acrylic fiber has been increased.

The invention is more fully illustrated by the examples which follow wherein all parts and percentages are by weight unless otherwise specified.

EXAMPLE 1

A spinning composition was prepared by dissolving 10 parts of a copolymer of 83% acrylonitrile, 10% vinylidene chloride, and 7% methyl acrylate in 90 parts of a 50% aqueous solution of sodium thiocyanate. Dibutyltin oxide having an average particle size of 5 microns was dispersed in the spinning composition in the amount of 1% based on the weight of the copolymer. A uniform dispersion was obtained.

The spinning composition thus obtained was spun into a 12% aqueous solution of sodium thiocyanate at −2° C. through a spinnerette having 50 orifices each of 0.09 millimeter diameter. The resulting filaments were washed in water, stretched at a stretch ratio of 10 in boiling water and then subjected to wet heat relaxation at 125° C. An acrylic fiber of good transparency and strength was obtained.

Twenty grams of this fiber were thoroughly opened and packed into a 100 ml. glass beaker. Twenty milligrams of hexamethylenetetramine were placed on the fiber as igniter and ignition was effected. The flame extinguished in 37 seconds and the weight of fiber burned was 2.8%.

The test was repeated on a fiber prepared in the same manner except that the dibutyltin oxide was omitted. The extinction time was 52 seconds and the weight of fiber burned was 49%.

The test was again repeated on a fiber prepared in the same manner except antimony oxide was used in place of dibutyltin oxide. The extinction time was 49 seconds and the weight of burned fiber was 45%.

This example shows that the flame retardancy of the acrylic fiber is markedly improved by the incorporation of dibutyltin oxide therein.

EXAMPLE 2

A spinning composition was prepared by dissolving 10 parts of a copolymer of 78% acrylonitrile, 15% vinylidene chloride, and 7% methyl acrylate in 90 parts of a 52% aqueous solution of sodium thiocyanate. A solution was prepared by dissolving 3 parts of dibutyltin oxide in 7 parts of dibutyltin maleate. Sufficient of the latter solution was dispersed in the spinning composition to provide 3% thereof based on the weight of the copolymer. A uniform dispersion was obtained.

The spinning solution thus obtained was spun into a 20% aqueous solution of sodium thiocyanate at −3°C. through a spinnerette having 50 orifices, each of a diameter of 0.09 millimeter. The resulting filaments were washed in water, stretched at a stretch ratio of 12 in boiling water, and subjected to wet heat relaxing at 124°C. A 6 denier acrylic fiber was obtained.

A fabric having a weight of 215 grams per square meter was knitted from the fiber obtained. The limiting oxygen index of the fabric was 21.8%.

The test was repeated on a fabric prepared in the same manner except that the dibutyltin oxide was omitted. The limiting oxygen index of this fabric was 20.8%.

This example shows the increased flame retardancy effected by incorporating dibutyltin oxide in the fiber.

The test was also repeated on a fabric prepared in the same manner except that antimony oxide was used in place of dibutyltin oxide. The fiber was severely impaired in luster and the knitted fabric was poor in commodity value. In contrast to this, the fiber obtained according to the present invention was not impaired in luster and had high commodity value.

Limiting Oxygen Index is determined by the following procedure. A knit fabric sample 5 cm. × 15 cm. is held vertically by a U-shaped holder and is ignited from above by a gas flame. The volume percent in the atmosphere of the minimum oxygen content required to burn the sample for at least 3 minutes or at least 5 cm. in length is determined. The greater is this value, the higher is the flame retardancy.

We claim:

1. A process for preparing a halogen-containing acrylic fiber of improved flame retardancy which comprises: preparing a spinning composition of a halogen-containing acrylonitrile polymer composed of at least 50 weight percent of acrylonitrile, said halogen being selected from chlorine and bromine and being in the amount of about 3 to 40 weight percent based on the weight of said polymer; uniformly dispersing in said spinning composition from about 0.1 to 10 weight percent, based on the weight of said polymer, of a diorganotin oxide compound of the formula

wherein $R_1$ and $R_2$ are individually selected from alkyl, alkenyl, aryl, alkaryl, aralkyl, cycloalkyl, and cycloalkenyl groups containing up to about 22 carbon atoms; and spinning the resulting dispersion.

2. The process of claim 1 wherein the acrylonitrile polymer contains a halogen-containing comonomer.

3. The process of claim 2 wherein the halogen-containing comonomer is vinylidene chloride.

4. The process of claim 1 wherein the diorganotin oxide compound is dibutyltin oxide.

5. The process of claim 1 wherein the spinning composition contains an aqueous thiocyanate salt solution as polymer solvent.

6. The process of claim 5 wherein the dispersion is spun by a wet-spinning procedure.

7. The process of claim 3 wherein the acrylonitrile polymer contains 83 weight percent acrylonitrile, 10 weight percent vinylidene chloride, and 7 weight percent methyl acrylate.

8. The process of claim 3 wherein the acrylonitrile polymer contains 78 weight percent acrylonitrile, 15 weight percent vinylidene chloride, and 7 weight percent methyl acrylate.

* * * * *